3,059,987
DYEING EXPANDED POLYSTYRENE ARTICLES WITH DISPERSE DYES

Herman P. Baumann, Charlotte, N.C., assignor to Koppers Company, Inc., a corporation of Delaware
No Drawing. Filed May 12, 1960, Ser. No. 28,554
2 Claims. (Cl. 8—4)

This invention relates to the coloring of expanded polystyrene articles and more particularly to dyeing processes and compositions for expanded polystyrene articles.

Expanded polystyrene is a widely used plastic material which is a coherent mass having a closed cell structure. Densities may range from less than 1 pound per cubic foot up to about 20 pounds per cubic foot, depending upon the amount of blowing agent used and the process by which the particles are expanded. Foam polystyrene articles may be of any size and configuration, e.g. sheet of several mils thickness, or a 12' x 4' x 12" building panel. Generally, the expanded polystyrene is produced by expanding particles of polystyrene which contain a blowing agent. These polystyrene particles are commercially available, one source of supply being Koppers Company, Inc., which sells pellets of this type under the trade name "Dylite" expandable polystyrene. These particles which contain blowing agent are capable upon the application of heat of foaming into the above-described structure.

Foamed polystyrene is naturally opaque white. For many applications it is desirable that the finished foam polystyrene article be colored. For instance, coloring would be useful in the identification of particular types, e.g. fire retardant, and obviously it would be almost a necessity for any article such as toys and display items, which are exposed to view.

Heretofore the only practical method of obtaining a colored article of foam polystyrene has been to use pellets or particles which have previously been dyed by any of the known processes for dyeing expandable polystyrene particles. Although these methods of obtaining colored articles of polystyrene have been used, they have not been altogether satisfactory. One drawback is that a large amount of dye is consumed since all particles used in the fabrication of the article must be colored, since the possibility always exists that in molding a mixture of colored and uncolored particles that the uncolored particles would migrate to the surface, thus giving a mottled appearance to the finished article.

It has now been found that by the novel process of this invention only the surface of the finished article is colored, such coloring being homogeneous. The novel process comprises immersing the expanded polystyrene in a bath that is an aqueous dispersion of an emulsified carrier containing up to about 4% by weight of a dispersed dye, and which is maintained at an elevated temperature of less than 180° F. for a period of time sufficient to cause dyeing but insufficient to attack the polystyrene, thereafter removing the dyed expandable polystyrene from the bath, rinsing with water, and drying.

The emulsified carrier is composed of 25-50% by weight of carrier and 50-75% by weight of anionic surfactant. Typical carriers are o-phenylphenol, methyl salicylate, biphenyl, butyl benzoate, benzoic acid and the chlorobenzenes. These latter compounds, the chlorobenzenes, are particularly effective. The emulsifier is any anionic surfactant such as the alkyl aryl sulfonates, sulfated alcohols, esters of sodium sulfosuccinic acid, and sulfated oils such as castor oil and olive oil. These anionic surfactants are commercially availabe substances sold under such trade names as Aerosol, Igepon, Tergitol, Nacconol NR, Santomerse.

The concentration of the emulsified carrier is important since concentrations higher than about 10% by weight will tend to dissolve the polystyrene and the article being dyed will have a very rough and unsightly appearance.

Disperse dyes, sometimes referred to as acetate rayon dyes, are organic colors which are applied from near-colloidal aqueous dispersions to textile fibers in which the dyes literally dissolve. These dyes include colors of the azo, azomethane, nitroarene and anthraquinone chemical classes, such as, for example, Celliton Fast Yellow G (IG) Disperse Yellow 3, Celliton Yellow 5G Disperse Yellow 5, Fast Yellow GLF Disperse Yellow 33, Celliton Orange GR Disperse Orange 3, Celliton Discharge Pink BRF Disperse Red 58, Celliton Scarlet B, Disperse Red 1, SRA Golden Yellow XIII Disperse Yellow 23, and SRA Golden Orange I Disperse Orange 1.

The concentration of the dye may be varied as desired, although no deepening of the resultant color is effected at concentrations above 4%. Thus, from an economic point of view, concentrations above 4% are impractical. Depending upon the shade desired, the concentration may range downward to less than 1%. The dye bath is conveniently prepared by adding the disperse dye to the emulsified carrier and then adding water, which may be heated. The temperature of the dye bath is above room temperature, preferably from about 125–165° F., but must not exceed 180° F., since at temperatures above 180° F. the polystyrene is deleteriously affected, in that the skin of the molded article swells and assumes a rough, beady appearance. The dyeing speed is temperature dependent, and the higher temperatures are preferred because of speed.

The immersion time, that is, the time the polystyrene article is in the dye bath, is important since a rough, unsightly appearance is caused if it is too long. At a 2% carrier concentration the immersion time must be no more than 20 seconds, and as low as 5 seconds. Correspondingly longer times may be used if the solution is more dilute with respect to the carrier. The optimum time for any particular system may be determined experimentally.

The following examples further illustrate the practice of the invention.

EXAMPLE I

Fifteen grams of Amacel Yellow G Supra Disperse Yellow 3 was added to 80 grams of a 75:25 mixture of biphenyl and sodium dodecyl benzenesulfonate, and poured into one liter of water, which was heated to a temperature of 140° F. A cup which had been molded of expandable polystyrene was then immersed in the dye bath for 15 seconds. The cup was removed and rinsed with cold water and then allowed to dry. Upon drying the cup was examined and was found to be an even yellow color. The cup was cut and only a slight penetration of the dye was observed.

EXAMPLE II

Example I was repeated three times, substituting for the Amacel Yellow G Supra respectively the three dyes Amacel Cerise BEx Disperse Red 11, Amacron Red Violet LS, Amacel Brilliant Blue BEx Disperse Blue 3. In each case there was obtained a cup which appeared to have a very smoothly dyed surface. Coverage was complete and there were no dark or light spots.

Example I was repeated except that there was substituted in the emulsified carrier the solvents listed in Table I below.

*Table I*

| Bath solvent: | Dyeing quality |
|---|---|
| Stoddard solution | Very rough surface, erratic coloring. |

| Bath solvent: | Dyeing quality |
|---|---|
| Benzene | Very rough surface, erratic coloring. |
| Methylethyl ketone | Very rough surface, erratic coloring. |
| Acetone | Very rough surface, erratic coloring. |
| Methyl salicylate | Good surface, even coloring. |
| Trichlorobenzene | Good surface, even coloring. |
| Orthophenyl phenol | Good surface, even coloring. |
| 2-ethoxyethanol | Good surface, poor coloring. |
| Diethyleneglycol ethylether | Good surface, poor coloring. |

As can be seen, the Stoddard solution, benzene, methylethyl ketone and acetone were much too reactive with the polystyrene, and gave a rough, erratically colored surface. The orthophenyl phenol, trichlorobenzene and the methyl salicylate were improved; the surface was good and the dyeing was even. The 2-ethoxyethanol and diethyleneglycol ethylether gave poor results, probably because there was no reaction with the surface of the polystyrene.

EXAMPLE III

Example I was repeated except that a 6% dye solution was used. There was no difference in the cup over that obtained in Example I.

EXAMPLE IV

Example I was repeated except that a 1% dye solution was used. The resultant cup was much lighter in color, that is, more pastel.

The foregoing has described a novel process and composition for the dyeing of expanded polystyrene. This process, in addition to providing an acceptably colored article, has the valuable additional feature of decreased dye consumption over those processes heretofore available.

I claim:

1. A process for homogeneously dyeing the surface of an expanded polystyrene article, which consists of immersing said article for from five to twenty seconds in a dye bath that is maintained at a temperature of between 125 and 180° F., said dye bath being formed by adding a disperse dye to an emulsified carrier which is a mixture of 50 to 75% of a carrier member selected from the group consisting of ortho phenylphenol, methylsalicylate, biphenyl, and trichlorobenzene, and 25 to 50% of an anionic surface active agent and dispersing said dye and emulsified carrier in water to provide a dye bath having from 1 to 4% by weight of dye and less than 10% by weight of emulsified carrier.

2. A process for dyeing a cup made of an expanded polystyrene which consists of imersing said cup for fifteen seconds in a dye bath that is at a temperature of 140° F. and that is formed by adding by weight 15 parts of a disperse dye to 80 parts of a 75:25 mixture of biphenyl and sodium dodecylbenzenesulfonate and adding the resultant mixture to one thousand parts of water, removing the cup from said bath, rinsing the cup, and drying the cup.

References Cited in the file of this patent

UNITED STATES PATENTS 2,926,987 Freyermuth _____ Mar. 1, 1960

OTHER REFERENCES

British Plastics, April 1950, pages 190–194.